(12) United States Patent
Chang

(10) Patent No.: US 9,977,891 B2
(45) Date of Patent: May 22, 2018

(54) ANONYMOUS AUTHENTIFICATION METHOD AND AUTHENTIFICATION SYSTEM USING THE SAME

(71) Applicant: CHANG JUNG CHRISTIAN UNIVERSITY, Tainan (TW)

(72) Inventor: Chi-Chao Chang, Tainan (TW)

(73) Assignee: CHANG JUNG CHRISTIAN UNIVERSITY, Tainan (TW)

( * ) Notice: Subject to any disclaimer, the term of this patent is extended or adjusted under 35 U.S.C. 154(b) by 142 days.

(21) Appl. No.: 15/245,963

(22) Filed: Aug. 24, 2016

(65) Prior Publication Data
US 2017/0063804 A1 Mar. 2, 2017

(30) Foreign Application Priority Data

Aug. 28, 2015 (TW) .............................. 104128347 A

(51) Int. Cl.
| | |
|---|---|
| *G06F 21/44* | (2013.01) |
| *H04L 29/06* | (2006.01) |
| *H04W 12/06* | (2009.01) |
| *H04L 9/14* | (2006.01) |
| *H04L 9/32* | (2006.01) |
| *G06F 21/42* | (2013.01) |
| *G06F 21/62* | (2013.01) |
| *H04W 12/02* | (2009.01) |

(52) U.S. Cl.
CPC .............. *G06F 21/44* (2013.01); *G06F 21/42* (2013.01); *G06F 21/6245* (2013.01); *H04L 9/14* (2013.01); *H04L 9/3226* (2013.01); *H04L 9/3271* (2013.01); *H04L 63/0421* (2013.01); *H04W 12/06* (2013.01); *H04L 2209/805* (2013.01); *H04L 2209/84* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 2007/0186105 A1* | 8/2007 | Bailey ................. | H04L 63/0492 713/168 |
| 2010/0020976 A1* | 1/2010 | Ma ......................... | H04H 60/23 380/278 |
| 2012/0047371 A1* | 2/2012 | Woodall .................. | G06F 21/76 713/189 |
| 2014/0263627 A1* | 9/2014 | Wyatt ..................... | G07F 19/00 235/380 |

(Continued)

*Primary Examiner* — Benjamin E Lanier
(74) *Attorney, Agent, or Firm* — Hamre, Schumann, Mueller & Larson, P.C.

(57) ABSTRACT

An anonymous authentication method is implemented by an authentication device that has a key array. The key array has multiple array dimensions each having multiple device keys. The method includes: receiving ciphertexts from a chip that has multiple chip keys; acquiring authentication keys by: for each of the ciphertexts, performing trails of decryption using the device keys of one of the array dimensions that corresponds to one of the chip keys used to generate the ciphertext one by one until obtaining one of the device keys that successfully decrypts the ciphertext to serve as one of the authentication keys; and obtaining, for authentication, information associated with the chip according to the authentication keys.

14 Claims, 6 Drawing Sheets

(56) References Cited

U.S. PATENT DOCUMENTS

| | | | | |
|---|---|---|---|---|
| 2015/0019442 A1* | 1/2015 | Hird | ................... | G06Q 20/3829 |
| | | | | 705/71 |
| 2016/0140356 A1* | 5/2016 | Tasher | ................ | G06F 12/1408 |
| | | | | 726/29 |
| 2016/0344712 A1* | 11/2016 | Ding | .................... | H04W 76/14 |

* cited by examiner

ANONYMOUS AUTHENTIFICATION METHOD AND AUTHENTIFICATION SYSTEM USING THE SAME

CROSS-REFERENCE TO RELATED APPLICATION

This application claims priority of Taiwanese Patent Application No. 104128347, filed on Aug. 28, 2015.

FIELD

The disclosure relates to an authentication method, and more particularly to an anonymous authentication method and a system using the same.

BACKGROUND

In the Internet era, leakage of personal information becomes an important issue. When wireless communication techniques such as RFID (radio frequency identification) are used in transaction, there is a risk that the personal information in a smart card may be stolen either during the wireless transaction process or by an unauthorized reader. A conventional anonymous authentication method employs a private authentication system in identification and/or authentication of RFID chips, and personal information is no longer provided during communication between the RFID chips and readers. Instead, the RFID chips encrypt non-specific data that are to be provided to the readers for enhancing safety. In such conventional method, each RFID chip corresponds to one distinct key, so when a large number (e.g. 1,000,000) of RFID chips use the authentication system, the back-end server system has to perform trials of decryption using a corresponding number (e.g., 1,000,000) of keys one by one to acquire a correct key that can successfully decrypt the encrypted data. As a result, trials of decryption and time required for acquiring the correct key may linearly increase with increase of the number of RFID chips, leading to high cost and inefficiency.

SUMMARY

Therefore, an object of the disclosure is to provide an anonymous authentication method and an authentication system that may have better efficiency in decryption while maintaining good security.

According to the disclosure, the anonymous authentication method includes steps of: (A) by an authentication device, receiving a plurality of ciphertexts from a chip, wherein the authentication device is communicatively coupled to the chip, and has a key array having a plurality of array dimensions, each of which has a plurality of device keys; the chip has a plurality of chip keys respectively corresponding to the array dimensions; and each of the chip keys is used by the chip to perform encryption according to at least an anchor received from the authentication device to generate a respective one of the ciphertexts; (B) by the authentication device, acquiring a plurality of authentication keys respectively corresponding to the ciphertexts by: for each of the ciphertexts, performing, on at least the anchor, trails of decryption using the device keys of one of the array dimensions that corresponds to one of the chip keys used to generate the ciphertext one by one until obtaining, from the one of the array dimensions, one of the device keys that successfully decrypts the ciphertext to serve as one of the authentication keys; and (C) by the authentication device, obtaining, for authentication, information associated with the chip according to the authentication keys.

According to the disclosure, the authentication system includes an authentication device, a reader and a chip. The authentication device is configured to generate an anchor, and has a key array that has a plurality of array dimensions. Each of the array dimensions has a plurality of device keys. The reader is communicatively coupled to the authentication device. The chip is communicatively coupled to the reader for receiving the anchor from the authentication device therethrough, and is configured to generate a plurality of ciphertexts by using the chip keys to individually perform encryption on at least the anchor. The authentication device is further configured to: acquire a plurality of authentication keys respectively corresponding to the ciphertexts by: for each of the ciphertexts, performing, according to at least the anchor, trails of decryption using the device keys of one of the array dimensions that corresponds to one of the chip keys used to generate the ciphertext one by one until obtaining, from the one of the array dimensions, one of the device keys that successfully decrypts the ciphertext to serve as one of the authentication keys, and obtain, for authentication, information associated with the chip according to the authentication keys.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
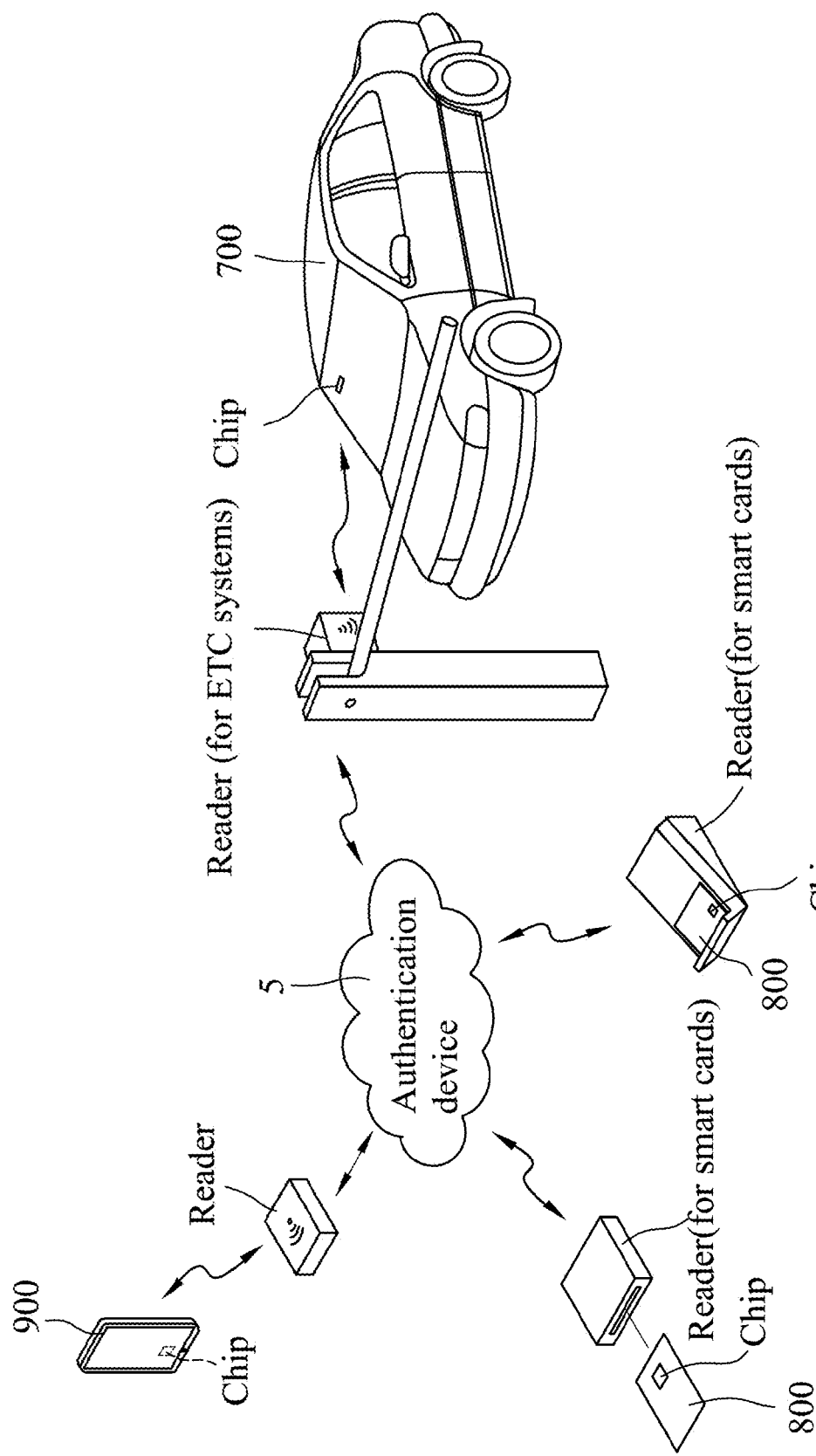
FIG. 1 is a schematic diagram illustrating an embodiment of an authentication system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
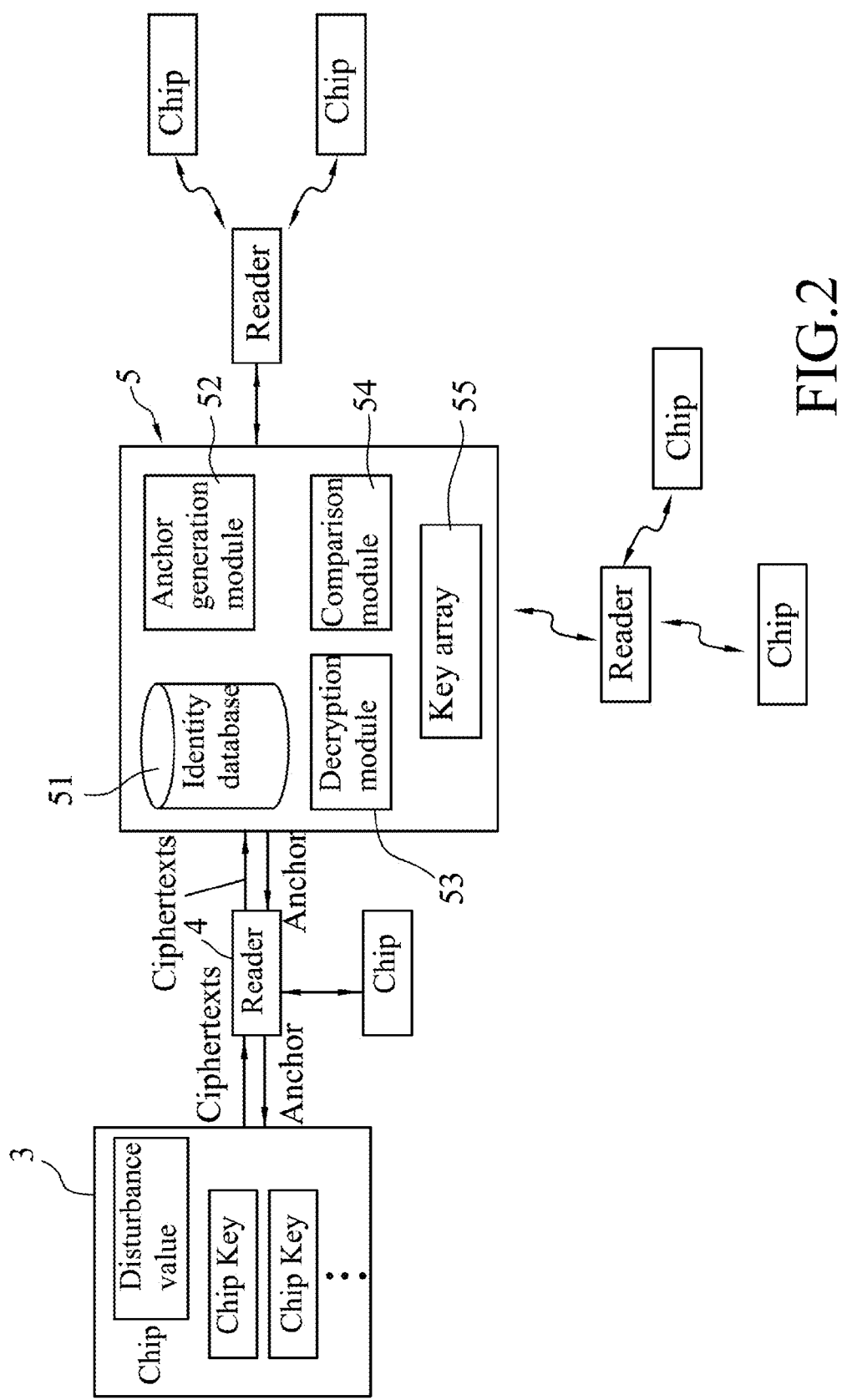
FIG. 2 is a block diagram illustrating a first embodiment of an authentication device according to the disclosure.

Referring to FIG. 1, an embodiment of an authentication system for anonymous authentication according to this disclosure is shown to include an authentication device 5, a plurality of chips and a plurality of readers corresponding to the chips. The authentication device 5 is adapted for authenticating the chips through the corresponding readers, each of which is communicatively coupled to the authentication device 5 and the corresponding chip(s). Referring to FIG. 2, a first embodiment of the authentication device 5 according to this disclosure is shown to be adapted to implement an embodiment of an anonymous authentication method according to this disclosure in a first manner, which will be described hereinafter using the first embodiment of the authentication device 5, one of the chips (e.g., chip 3), and one of the readers (e.g., reader 4) corresponding to the chip 3.

The chip 3 may be an RFID chip having a plurality of chip keys. When the chip 3 receives an anchor, which may be generated by the authentication device 5, through the reader 4, the chip 3 may thus be triggered to generate a disturbance value. The chip 3 then generates a plurality of ciphertexts by using the chip keys to individually perform encryption according to a combination of the anchor and the disturbance value, and provides the ciphertexts to the authentication device 5 through the reader 4. Referring to FIG. 1 again, such a chip may be applied to ETC (electronic toll collection) systems for verification of a vehicle 700, smart cards 800 (e.g., a credit card, a fare card, etc.), a mobile device 900 (e.g., a mobile phone, a tablet computer, a smart watch, a smart glasses, etc.), and is not limited thereto.

Turning back to FIG. 2, the reader 4 is configured to generate and provide an authentication request to the authentication device 5 upon sensing the chip 3. Such a reader may be applied to, but not limited to, the ETC systems for monitoring passage of vehicles, an access system of a parking lot, a cashier, a computer, etc. Communications between the reader 4 and the chip 3 and between the reader 4 and the authentication device 5 may be implemented by either wireless communication or direct electrical connection, so as to transmit the anchor to the chip 3, and to transmit the ciphertexts to the authentication device 5. In practice, the reader 4 may be communicatively coupled to the authentication device 5 via the Internet, a wireless network (e.g., mobile communication network), wired connection, etc., or may be integrated within the authentication device 5. Detailed communication techniques and structures for the reader 4 should be familiar to those skilled in the art, and are not described herein for the sake of brevity.

In this embodiment, the authentication device 5 includes an identity database 51, an anchor generation module 52, a decryption module 53, a comparison module 54, and a key array 55 that has a plurality of array dimensions independent from each other. The identity database 51 stores a plurality of identity information items, each of which has an identity index associated with the chip keys of a valid chip, and has identity information associated with a user of the valid chip.

Figure 3:
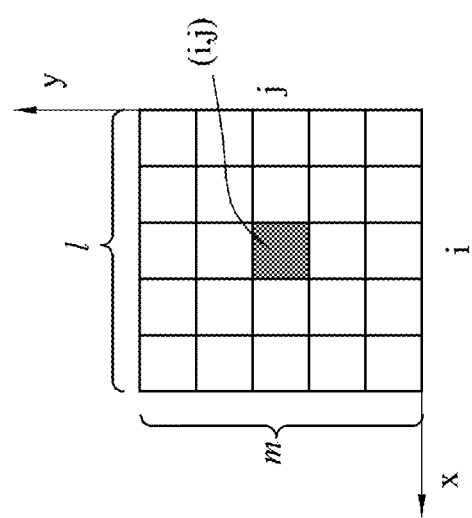
FIG. 3 is a schematic diagram illustrating array dimensions of the first embodiment of the authentication device.

A quantity of the chip keys for each chip is the same as that of the array dimensions, and the chip keys for each chip respectively correspond to the array dimensions. Further referring to FIG. 3, the first manner of the anonymous authentication method is described by exemplifying the key array to have two array dimensions (x), (y), but the disclosure is not limited thereto. Correspondingly, the chip 3 has two chip keys.

In this embodiment, each array dimension has a plurality of indices, and a plurality of device keys respectively corresponding to the indices. As an example, the array dimension (x) has a quantity l of the device keys, and the array dimension (y) has a quantity m of the device keys, so the key array 55 has in total l×m device key combinations (or index combinations) each corresponding to a respective identity index. Each chip key of the chip 3 is identical to one of the device keys of the corresponding array dimension, so the ciphertexts, which are generated respectively using the chip keys, correspond to the array dimensions, respectively.

Figure 4:
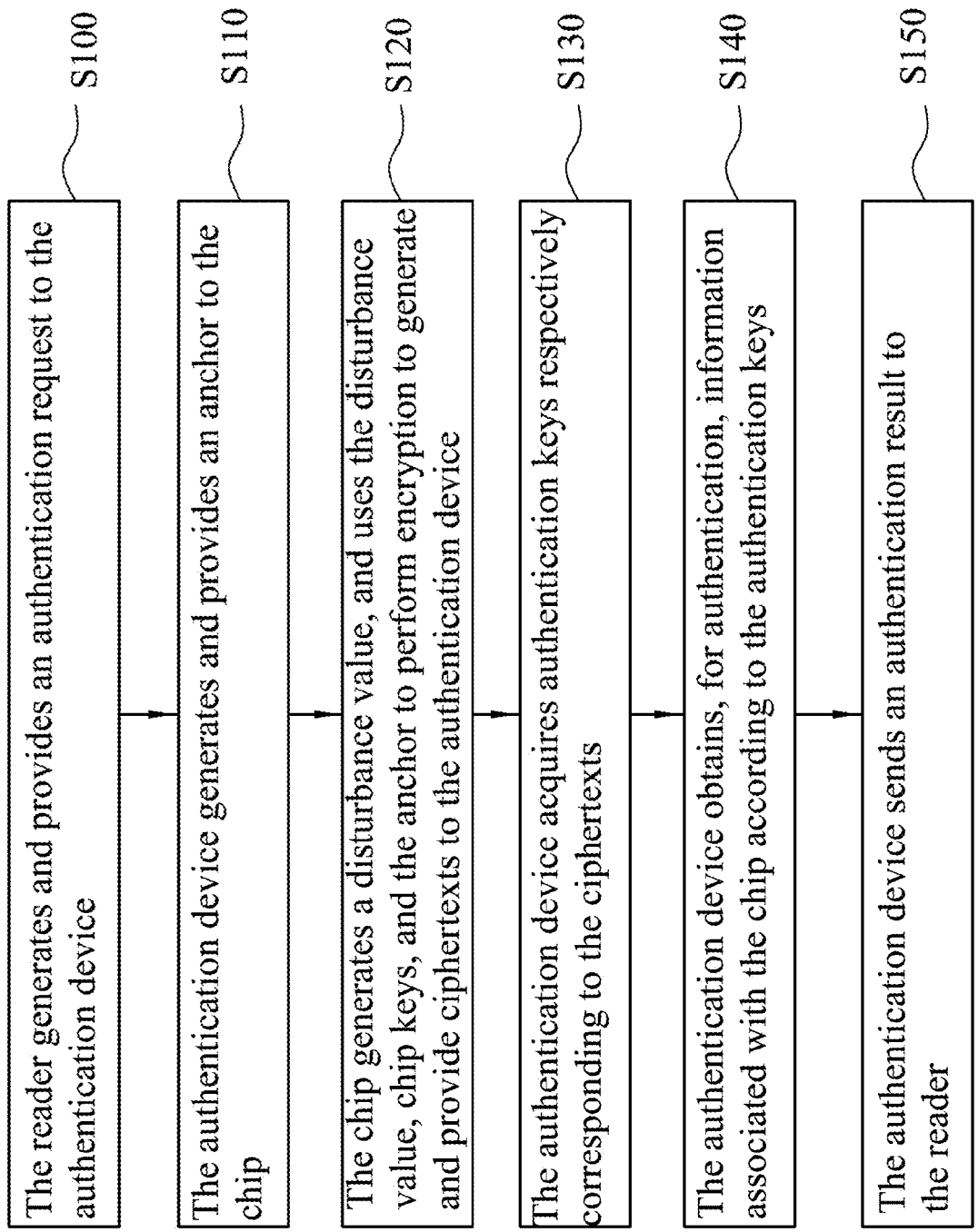
FIG. 4 is a flow chart illustrating steps of an anonymous authentication method according to the disclosure.

Referring to FIG. 4, the embodiment of the anonymous authentication method includes the following steps S100-S150.

Step S100: Upon sensing the chip 3, the reader 4 generates and provides an authentication request to the authentication device 5. The chip 3 therefore serves as a chip under authentication.

Step S110: Upon receipt of the authentication request by the authentication device 5, the anchor generation module 52 generates an anchor, and the authentication device 5 provides the anchor to the chip 3 through the reader 4. In this embodiment, the anchor is randomly generated, but this disclosure is not limited thereto.

Step S120: Upon receipt of the anchor, the chip 3 generates a disturbance value, generates a plurality of ciphertexts by using the chip keys to individually perform encryption on a combination of the anchor and the disturbance value (i.e., each of the chip keys is used to generate a respective one of the ciphertexts), and provides the ciphertexts to the authentication device 5 through the reader 4. In this embodiment, the disturbance value is randomly generated, but this disclosure is not limited thereto.

In this embodiment, the chip keys are used to perform encryption on the same combination of the anchor and the disturbance value. In some embodiments, the authentication device 5 may randomly generate different anchors respectively corresponding to the array dimensions, and the chip 3 may randomly generate different disturbance values respectively corresponding to the array dimensions, so as to generate each of the ciphertexts by using a respective chip key to perform encryption on a combination of a respective anchor and a respective disturbance value according to the respective array dimension, thereby significantly increasing complexity of cracking the ciphertexts. In some embodiments, the authentication device 5 may randomly generate only one anchor, while the chip 3 may randomly generate multiple disturbance values, or vice versa.

Step S130: After receiving the ciphertexts, the authentication device 5 acquires, from the device keys, a plurality of authentication keys respectively corresponding to the ciphertexts. In detail, for each of the ciphertexts, the decryption module 53 performs trails of decryption using the device keys of one of the array dimensions that corresponds to one of the chip keys used to generate the ciphertext one by one until obtaining, from the one of the array dimensions, one of the device keys, which successfully decrypts the ciphertext to obtain the anchor, to serve as one of the authentication keys. In the first manner, the decryption module 53 confirms whether or not a decryption result includes the anchor that is the same as that provided to the chip 3 in step S110 for every trail of decryption, thereby searching for a correct device key (e.g., a device key corresponding to index (i) in FIG. 3) from the array dimension (x) for one ciphertext, and a correct device key (e.g., a device key corresponding to index (j) in FIG. 3) from the array dimension (y) for another ciphertext, so that a set of authentication keys (e.g., a device key combination corresponding to a set of indices (i, j) in FIG. 3) is thus obtained in this embodiment. Since the ciphertexts respectively correspond to different array dimensions, searching for the correct device keys for different ciphertexts may be performed at the same time in a manner of parallel computing, so that time required for trails of decryption may be significantly reduced. It is noted that the chip 3 may generate the ciphertexts with different character strings such that the authentication device 5 may correctly identify correspondences between the ciphertexts and the array dimensions, but this disclosure is not limited thereto.

Step S140: The comparison module 54 obtains, for authentication, information associated with the chip 3 according to the authentication keys. In the first manner, the comparison module 54 compares the indices of the set (e.g., the set of indices (i, j) in FIG. 3) that respectively correspond to the authentication keys with the identity indices in the identity database 51, so as to authenticate validity of the chip 3 by confirming whether or not the identity database 51 has an identity information item corresponding to the set of indices. An affirmative confirmation result indicates that the chip 3 is valid, and a negative confirmation result indicates that the chip 3 is invalid.

Step S150: The comparison module 54 sends an authentication result to the reader 4 for output thereby, so that the user (e.g., an administrator of a parking lot) may be aware of validity of the chip 3.

Accordingly, the identity information associated with a user of the chip 3 may be identified and the validity of the chip 3 may be authenticated by the authentication device 5 without provision of the identity information of the user by the chip 3. The first manner of the anonymous authentication method according to this disclosure has at least the following advantages:

1. Since the anchor and the disturbance value are both randomly generated, which means that different anchors and different disturbance values are used in every instance of the authentication, the validity of the chip 3 and the identity information associated with the user of the chip 3 can hardly be obtained even if the ciphertexts are stolen during wireless data transmission, thereby enhancing security.

2. Since generation of the ciphertexts are triggered after the chip 3 receives the anchor provided by the authentication device 5 through the reader 4, a reader that is not communicatively coupled to the authentication device 5 is unable to cause the chip 3 to provide any information for authentication, thereby preventing the reader that is not communicatively coupled to the authentication device 5 from reading information from the chip 3.

3. Since the key array 55 is designed to be multidimensional, required computation may be significantly reduced. As an example, in a case that the key array 55 has three array dimensions each having 100 device keys, there are in total 1,000,000 device key combinations. By use of the first manner of the anonymous authentication method according to this disclosure, the correct device key combination (i.e., the authentication keys) may be acquired with 300 trials of decryption at most (100 trials of decryption for each array dimension), thereby reducing required trials of decryption. In addition, since the ciphertexts respectively correspond to the array dimensions that are independent from each other, trials of decryption for the ciphertexts may be performed at the same time in a manner of parallel computing, time required for the trials of decryption may thus be further reduced.

Figure 5:
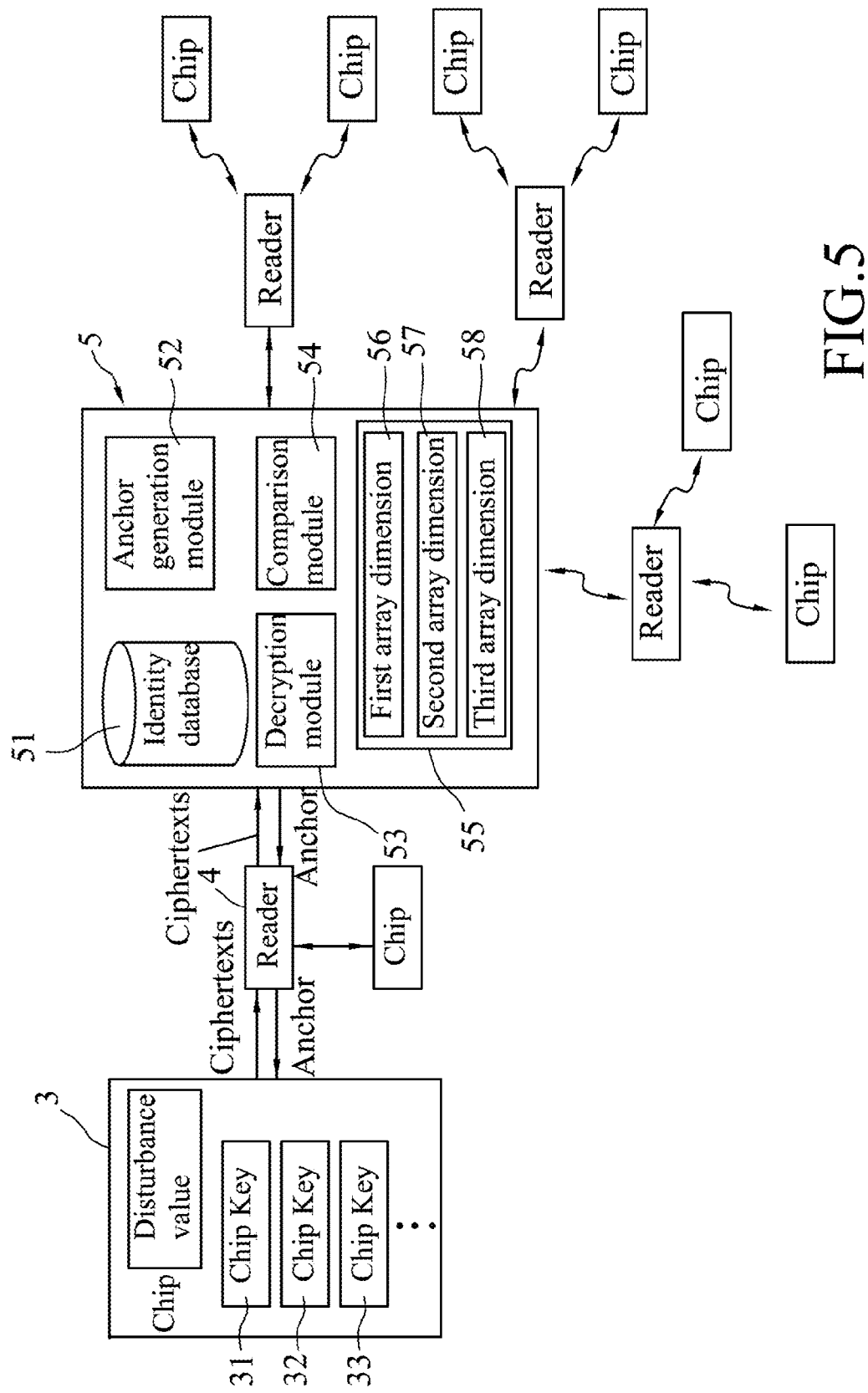
FIG. 5 is a block diagram illustrating a second embodiment of an authentication device according to the disclosure.
Figure 6:
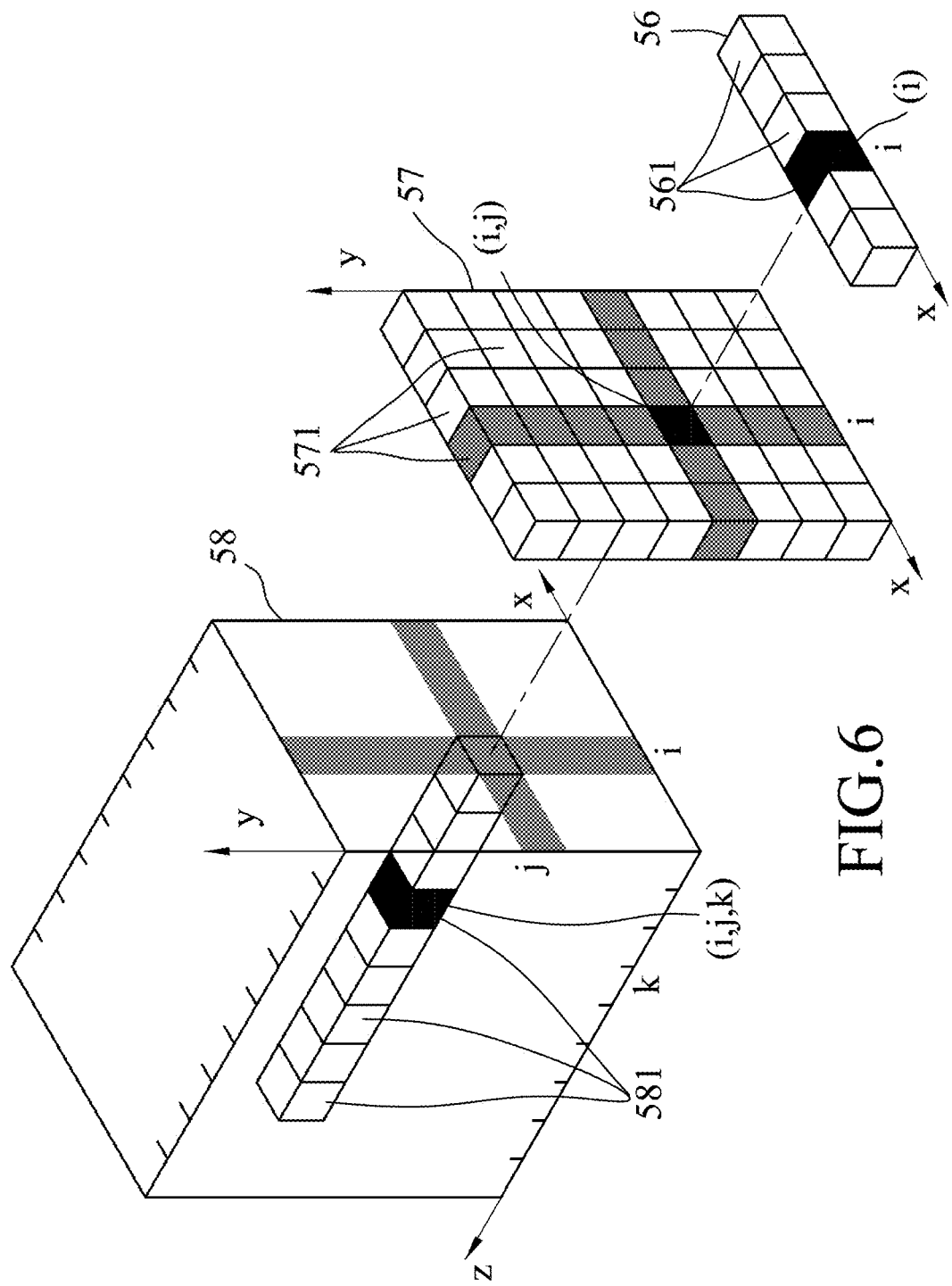
FIG. 6 is a schematic diagram illustrating array dimensions of the second embodiment of the authentication device.

Referring to FIGS. 5 and 6, a second embodiment of the authentication device 5 according to this disclosure is shown to differ from the first embodiment majorly in that, in the second embodiment, the array dimensions are not independent from each other. In detail, the key array 55 has a number N of the array dimensions, where N is an integer greater than one. Each of the device keys of a first one of the array dimensions has an index formed by one index component. Each of the device keys of an $n^{th}$ ($2 \leq n \leq N$) one of the array dimensions has an index formed by a number n of index components among which first to $(n-1)^{th}$ one(s) of the index components respectively correspond to the index component(s) of one of the device keys of an $(n-1)^{th}$ one of the array dimensions. In the following exemplary implementation, N=3, the key array 55 has a first array dimension 56 formed by an axis (x), a second array dimension 57 formed by the axis (x) and an axis (y), and a third array dimension 58 formed by the axis (x), the axis (y) and an axis (z). The chip 3 has three chip keys 31, 32, 33 respectively corresponding to the array dimensions 56, 57, 58, and uses the chip keys 31-33 to perform encryption on the combination of the anchor and the disturbance value to respectively generate first to third ciphertexts. It is noted that this disclosure is not limited to that N=3, the integer (N) may be 2 or other positive integers other than one in other embodiments.

The first array dimension 56 has a plurality of device keys 561. Each device key 561 has an index formed by one index component (e.g., an index number "i" of the axis (x)). The second array dimension 57 has a plurality of device keys 571. Each device key 571 has an index formed by two index components (e.g., (i, j), formed by the index number "i" of the axis (x) and an index number "j" of the axis (y)) where a first one of the two index components (e.g., "i") corresponds to the index component of one of the device keys 561 of the first array dimension 56. The third array dimension 58 has a plurality of device keys 581. Each device key 581 has an index formed by three index components (e.g., (i, j, k), formed by the index number "i" of the axis (x), the index number "j" of the axis (y), and an index number "k" of the axis (z)) where first and second ones of the three index components (e.g., "i" and "j")) correspond to the index components of one of the device keys 571 of the second array dimension 57. In this embodiment, the axis (x) has a quantity l of index numbers, the axis (y) has a quantity m of index numbers, and the axis (z) has a quantity n of index numbers. Accordingly, the first array dimension 56 has a number l of the device keys 561, the second array dimension 57 has a number l×m of the device keys 571, the third array dimension 58 has a number l×m×n of the device keys 581, and the key array 55 has in total a number l+(l×m)+(l×m×n) of the device keys.

The second embodiment of the authentication device 5 is adapted to implement the embodiment of the anonymous authentication method in a second manner, which is similar to the first manner. In the second manner, step S130 includes the following details.

For a first one of the ciphertexts (e.g., the first ciphertext) generated using a first one of the chip keys (e.g., the chip key 31) that corresponds to a first one of the array dimensions (e.g., the array dimension 56), the authentication device 5 performs trials of decryption using the device keys (e.g., device keys 561) of the first one of the array dimensions one by one until obtaining, from the first one of the array dimensions, one of the device keys, which successfully decrypts the first one of the ciphertexts to obtain the anchor, to serve as a first one of the authentication keys (e.g., the device key 561 that has the index (i)).

For an $n^h$ one of the ciphertexts (e.g., the second ciphertext or the third ciphertext) generated using an $n^{th}$ one of the chip keys (e.g., the chip key 32 or 33) that corresponds to an $n^{th}$ one of the array dimensions (e.g., the array dimension 57 or 58), the authentication device 5 performs, using the device keys of the $n^{th}$ one of the array dimensions whose first to $(n-1)^{th}$ ones of the index components respectively correspond to the index components of the $(n-1)^{th}$ one of the authentication keys (e.g., the device keys 571 whose first index component is "i", or the device keys 581 whose first and second index components are respectively "i" and "j") one by one until obtaining, from the $n^{th}$ one of the array dimensions, one of the device keys, which successfully decrypts the $n^{th}$ one of the ciphertexts to obtain the anchor, to serve as an $n^{th}$ one of the authentication keys (e.g., the device key 571 that has the index (i, j) and the device key 581 that has the index (i, j, k)).

Referring to FIGS. 5 and 6 as an example, for the first ciphertext that is generated using the chip key 31, the authentication device 5 performs trials of decryption using the device keys 561 one by one until obtaining one of the device keys 561 that has the index (i), which successfully decrypts the first ciphertext to obtain the anchor, to serve as a first authentication key. For the second ciphertext that is generated using the chip key 32, the authentication device 5 performs trials of decryption using the device keys 571 whose first index component is "i" one by one until obtaining one of the device keys 571 that has the index (i, j), which successfully decrypts the second ciphertext to obtain the anchor, to serve as a second authentication key. For the third ciphertext that is generated using the chip key 33, the authentication device 5 performs trials of decryption using the device keys 581 whose first and second index components are respectively "i" and "j" one by one until obtaining one of the device keys 581 that has the index (i, j, k), which successfully decrypts the third ciphertext to obtain the anchor, to serve as a third authentication key. As a result, the correct device key combination (i.e., the authentication keys) may be acquired with (l+m+n) trials of decryption at most in the exemplary implementation. When l=m=n=100, the key array 55 has in total 1,010,100 device keys, while the correct device key combination may be acquired with 300 trials of decryption at most, thereby significantly reducing trials of decryption and time required for computation.

For step S140, in the second manner, the comparison module 54 compares the index of the $N^{th}$ authentication key (e.g., the device key 581 that has the index (i, j, k)) with the identity indices in the identity database 51, so as to authenticate validity of the chip 3 by confirming whether or not the identity database 51 has an identity information items corresponding to the index of the $N^{th}$ authentication key.

By virtue of the index of the first authentication key points to a portion of the index components of the second authentication key, and the index of the second authentication key points to a portion of the index components of the third authentication key, the second and third authentication keys cannot be acquired when the first authentication key is not acquired, thereby achieving relatively higher security.

In addition, since the anchor and the disturbance value are both randomly generated in this embodiment, which means that the ciphertexts generated according to the anchor and the disturbance value are different in every instance of the authentication, the validity of the chip 3 and the identity information associated with the user of the chip 3 can hardly be obtained even if the ciphertexts are stolen during wireless data transmission, thereby enhancing security.

In summary, by use of the anonymous authentication method according to this disclosure, the chip 3 is not required to provide identity information during communication with the reader 4, thereby preventing leakage of the identity information of the user of the chip 3. In addition, the multi-dimensional structure of the key array 55 may result in a large number of the device keys and high complexity for decryption, thereby enhancing security while enabling good computation efficiency. Furthermore, the first manner of the anonymous authentication method enables parallel computing for the ciphertexts, thereby significantly reducing time required for the trials of decryption.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An anonymous authentication method comprising steps of:
    (A) by an authentication device, receiving a plurality of ciphertexts from a chip, wherein the authentication device is communicatively coupled to the chip, and has a key array having a plurality of array dimensions, each of which has a plurality of device keys; the chip has a plurality of chip keys respectively corresponding to the array dimensions; and each of the chip keys is used by the chip to perform encryption on at least an anchor received from the authentication device to generate a respective one of the ciphertexts;
    (B) by the authentication device, acquiring a plurality of authentication keys respectively corresponding to the ciphertexts by: for each of the ciphertexts, performing, according to at least the anchor, trials of decryption using the device keys of one of the array dimensions that corresponds to one of the chip keys used to generate the ciphertext one by one until obtaining, from the one of the array dimensions, one of the device keys that successfully decrypts the ciphertext to serve as one of the authentication keys; and
    (C) by the authentication device, obtaining, for authentication, information associated with the chip according to the authentication keys.

2. The anonymous authentication method of claim 1, wherein, in step (B), the trials of decryption for all of the ciphertexts are performed at the same time in a manner of parallel computing.

3. The anonymous authentication method of claim 1, wherein the key array has a number N of the array dimensions, where N is an integer greater than one; and
    step (B) includes:
        for a first one of the ciphertexts generated using a first one of the chip keys that corresponds to a first one of the array dimensions, performing, according to at least the anchor, the trials of decryption using the device keys of the first one of the array dimensions one by one until obtaining, from the first one of the array dimensions, one of the device keys that successfully decrypts the first one of the ciphertexts to serve as a first one of the authentication keys; and
        for an $n^{th}$ one of the ciphertexts generated using an $n^{th}$ one of the chip keys that corresponds to an $n^{th}$ one of the array dimensions, performing, according to at least the anchor and an $(n-1)^{th}$ one of the authentication keys, the trials of decryption using the device keys of the $n^{th}$ one of the array dimensions one by one until obtaining, from the $n^{th}$ one of the array dimensions, one of the device keys that successfully decrypts the $n^{th}$ one of the ciphertexts to serve as an $n^{th}$ one of the authentication keys, where n is an integer and $2 \le n \le N$.

4. The anonymous authentication method of claim 3, wherein each of the device keys of each of the array dimensions has an index, and a portion of the index of each of the device keys of the $n^{th}$ one of the array dimensions corresponds to the index of one of the device keys of an $(n-1)^{th}$ one of the array dimensions; and in step (B), for the $n^{th}$ one of the ciphertexts, the trials of decryption is performed, according to at least the anchor, using the device keys of the $n^{th}$ one of the array dimensions whose index has a portion corresponding to the index of the $(n-1)^{th}$ one of the authentication keys one by one until obtaining the $n^{th}$ one of the authentication keys from the $n^{th}$ one of the array dimensions.

5. The anonymous authentication method of claim 3, wherein each of the device keys of the first one of the array dimensions has one index component;

each of the device keys of the $n^{th}$ one of the array dimensions has a number n of index components among which first to $(n-1)^{th}$ ones of the index components respectively correspond to the index components of one of the device keys of an $(n-1)^{th}$ one of the array dimensions; and in step (B), for the $n^{th}$ one of the ciphertexts, the trials of decryption is performed, according to at least the anchor, using the device keys of the $n^{th}$ one of the array dimensions whose first to $(n-1)^{th}$ ones of the index components respectively correspond to the index components of the $(n-1)^{th}$ one of the authentication keys one by one until obtaining the $n^{th}$ one of the authentication keys from the $n^{th}$ one of the array dimensions.

6. The anonymous authentication method of claim 1, wherein step (C) includes: by the authentication device, authenticating validity of the chip according to the authentication keys; and the anonymous authentication method further comprises a step of: (D) by the authentication device, providing an authentication result obtained in step (C) to a reader through which the authentication device is communicatively coupled to the chip.

7. The anonymous authentication method of claim 1, wherein the anchor is randomly generated by the authentication device, the chip randomly generates a disturbance value, and each of the ciphertexts is generated by the chip using a respective one of the chip keys to encrypt a combination of the anchor and the disturbance value.

8. An authentication system comprising:
an authentication device configured to generate an anchor, and having a key array that has a plurality of array dimensions, each of which has a plurality of device keys;
a reader communicatively coupled to said authentication device; and
a chip communicatively coupled to said reader for receiving the anchor froth said authentication device therethrough, the chip being configured to generate a plurality of ciphertexts by using said chip keys to individually perform encryption on at least the anchor and configured to transmit the plurality of ciphertexts to the authentication device;
wherein said authentication device is further configured to:
acquire a plurality of authentication keys respectively corresponding to the ciphertexts by: for each of the ciphertexts, performing, according to at least the anchor, trials of decryption using said device keys of one of said array dimensions that corresponds to one of said chip keys used to generate the ciphertext one by one until obtaining, from the one of said array dimensions, one of said device keys that successfully decrypts the ciphertext to serve as one of the authentication keys, and
obtain, for authentication, information associated with said chip according to the authentication keys.

9. The authentication system of claim 8, wherein said authentication device is further configured to perform the trials of decryption for all of the ciphertexts at the same time in a manner of parallel computing.

10. The authentication system of claim 8, wherein said key array has a number N of said array dimensions, where N is an integer greater than one; and
said authentication device is further configured to:
perform, for a first one of the ciphertexts generated using a first one of said chip keys that corresponds to a first one of said array dimensions, according to at least the anchor, the trials of decryption using said device keys of the first one of said array dimensions one by one until obtaining, from the first one of said array dimensions, one of said device keys that successfully decrypts the first one of the ciphertexts to serve as a first one of the authentication keys; and
perform, for an $n^{th}$ one of the ciphertexts generated using an $n^{th}$ one of said chip keys that corresponds to an $n^{th}$ one of said array dimensions, according to at least the anchor and an $(n-1)^{th}$ one of the authentication keys, the trials of decryption using said device keys of the $n^{th}$ one of said array dimensions one by one until obtaining, from the $n^{th}$ one of said array dimensions, one of said device keys that successfully decrypts the $n^{th}$ one of the ciphertexts to serve as an $n^{th}$ one of the authentication keys, where n is an integer and $2 \le n \le N$.

11. The authentication system of claim 10, wherein each of said device keys of each of said array dimensions has an index, and a portion of said index of each of said device keys of the $n^{th}$ one of said array dimensions corresponds to said index of one of said device keys of an $(n-1)^{th}$ one of said array dimensions; and
said authentication device is further configured to perform, for the $n^{th}$ one of the ciphertexts, the trials of decryption according to at least the anchor using said device keys of the $n^{th}$ one of said array dimensions whose index has a portion corresponding to said index of the $(n-1)^{th}$ one of the authentication keys one by one until obtaining the $n^{th}$ one of the authentication keys from the $n^{th}$ one of said array dimensions.

12. The authentication system of claim 10, wherein each of said device keys of the first one of said array dimensions has one index component;
each of said device keys of the $n^{th}$ one of said array dimensions has a number n of index components among which first to $(n-1)^{th}$ ones of said index components respectively correspond to said index components of one of said device keys of an $(n-1)^{th}$ one of said array dimensions; and
said authentication device is further configured to perform, for the $n^{th}$ one of the ciphertexts, the trials of decryption according to at least the anchor using said device keys of the $n^{th}$ one of said array dimensions whose first to $(n-1)^{th}$ ones of said index components respectively correspond to said index components of the $(n-1)^{th}$ one of the authentication keys one by one until obtaining the $n^{th}$ one of the authentication keys from the $n^{th}$ one of said array dimensions.

13. The authentication system of claim 8, wherein said authentication device is further configured to authenticate validity of said chip according to the authentication keys, and to provide an authentication result to said reader.

14. The authentication system of claim 8, wherein said authentication device is configured to generate the anchor randomly, and said chip is further configured to randomly generate a disturbance value, and to generate each of the ciphertexts using a respective one of said chip keys to encrypt a combination of the anchor and the disturbance value.

* * * * *